United States Patent [19]

Sharbaugh et al

[11] 4,054,680

[45] Oct. 18, 1977

[54] METHOD OF FABRICATING IMPROVED CAPACITORS AND TRANSFORMERS

[75] Inventors: Amandus H. Sharbaugh, Clifton Park; David G. Shaw, Glens Falls, both of N.Y.

[73] Assignee: General Electric Company, Schenectady, N.Y.

[21] Appl. No.: 700,298

[22] Filed: June 28, 1976

[51] Int. Cl.$^2$ .......................... B05D 3/06; B05D 5/12
[52] U.S. Cl. ........................................ 427/13; 264/22; 427/41; 427/79; 427/80; 427/81; 427/116
[58] Field of Search ...................... 264/22; 427/41, 79, 427/80, 81, 13, 116

[56] References Cited
U.S. PATENT DOCUMENTS

| 2,793,970 | 5/1957 | Jeppson | 264/22 X |
| 2,870,044 | 1/1959 | Blatz | 427/79 X |
| 2,900,277 | 8/1959 | Schmitz et al. | 427/79 X |
| 3,206,826 | 9/1965 | Samoden | 29/25.42 |
| 3,421,930 | 1/1969 | Knox et al. | 427/41 |
| 3,665,269 | 5/1972 | Wright et al. | 427/79 X |
| 3,901,994 | 8/1975 | Mehalso et al. | 427/79 X |

Primary Examiner—Michael R. Lusignan
Attorney, Agent, or Firm—Marvin Snyder; Joseph T. Cohen; Jerome C. Squillaro

[57] ABSTRACT

Before impregnation with fluid a capacitor roll, or a transformer core and coil, is filled with a monomeric gas that is thereafter polymerized, in situ, in a plasma discharge. Formation of solid polymer occurs at the regions of most intense electric field, thereby raising both corona-start and operating voltage for these devices.

7 Claims, 3 Drawing Figures

METHOD OF FABRICATING IMPROVED CAPACITORS AND TRANSFORMERS

INTRODUCTION

This invention relates to capacitor and transformer fabrication, and more particularly to a process for increasing both corona-start and operating voltage for such devices.

Capacitor or transformer lifetime can be adversely affected by presence of corona in the impregnating liquid or gas at the region of most intense field, such as foil edges of capacitors or tap straps, or asperities on the electrodes of either capacitors or transformers. Thus it is necessary to operate such capacitors and transformers at voltage levels below the corona-start voltage. If the corona-start voltage can be raised, the capacitors can be operated at higher voltages and consequently higher energy density; similarly, if transformer radio interference voltage or corona-onset voltage can be raised, transformer electrical operating stresses can be increased.

Some organic vapors, and specifically monomeric gases, when subjected to an electrical discharge, yield polymeric deposits on the electrodes. This phenomenon can be utilized to deposit solid dielectric layers at interstitial sites within wound capacitor rolls, at edges of capacitor electrodes, at high stress asperities within capacitor rolls, or at edges of sheet-wound transformer coils, and provides the advantage of preferentially depositing that material in those areas where the electric field is highest.

The present invention concerns a process that improves the corona start voltage of a capacitor roll, wire-wound transformer core and coil, or sheet-wound transformer coil, by a monomeric gas which is polymerized, in situ, to a solid. The monomeric gas is preferably unsaturated, and hence more readily polymerizable than a saturated gas. Conventional impregnation by a dielectric fluid (i.e. dielectric liquid or gas) may follow. Presence of the solid polymer at propitious sites in the device, whether or not the device is subsequently impregnated, advantageously raises the corona-start voltage of the device.

Accordingly, one object of the invention is to provide a method of fabricating liquid-impregnated or gas-filled capacitors and transformers exhibiting exceptionally high corona-start voltages.

Another object is to provide a method of forming solid polymer in capacitor rolls, transformer cores, and sheet-wound transformer coils at the regions of most intense electric field therein.

Another object is to provide a method of fabricating capacitors and transformers wherein electron emission into liquid dielectric is blocked, local electric fields are reduced, and breakdown strength is increased near the surfaces having high field intensities in gas-filled capacitors and transformers.

Briefly, in accordance with a preferred embodiment of the invention, a process for increasing corona-start voltage and operating voltage of an electrical device to be fluid-impregnated is described. The device includes a layer of insulating material between two layers of conductor. The process comprises maintaining the device in an atmosphere of monomeric gas, and converting the monomeric gas to solid polymer at regions of high electrical stress in the device when a voltage is applied across the two layers of conductor.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
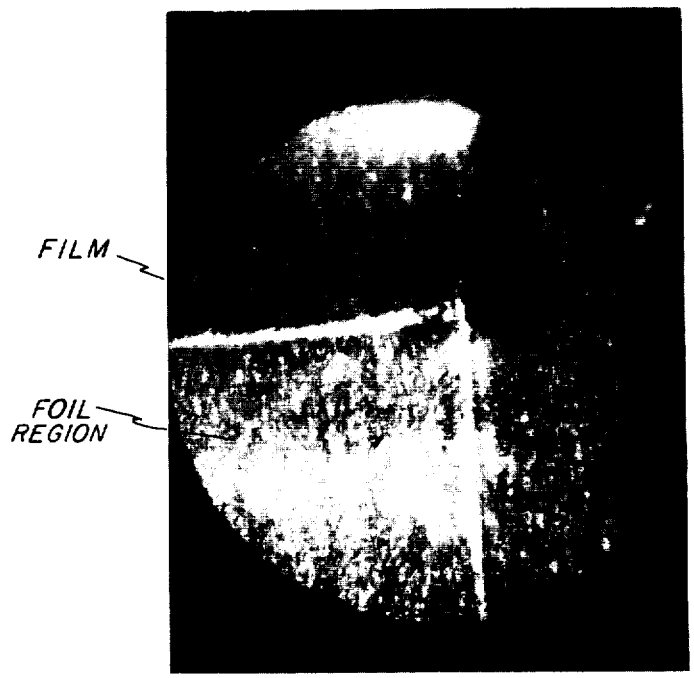
FIG. 1 is a micrograph showing deposits of acrylonitrile polymer on the polypropylene film of a capacitor, beneath and alongside the aluminum foil of the capacitor (at magnification $72\times$), the aluminum foil having been stripped away from the film.

One reason for electrical failure of a device having a layer of insulating material between two layers of conductor, such as a capacitor wherein all three layers are wound in common in convolute fashion, is believed to be the onset of local electrical discharges in the impregnating fluid at regions of high electrical stress. Consequently, devices of this type are never intentionally operated at voltages sufficiently high to precipitate such discharges. On the other hand, since energy storage density in a capacitor varies with the square of the operating voltage, it is desirable to raise the corona-start voltage to as high a value as possible and operate the capacitor at a voltage level just below this value.

It is well-known in the art that solid polymers have electrical breakdown stresses that are higher than those for liquids or gases. Consequently, corona-start voltage can be elevated if solid polymer is caused to form in the regions of high electrical stress in a capacitor roll, transformer core, or sheet-wound transformer coil, supplanting or assisting liquid or gas impregnant in these regions. Moreover, use of a solid dielectric provides a barrier to electron emission into the impregnating gas or liquid dielectric, thereby eliminating another possible mechanism for failure of the device. In the case of a gas-filled device, the local electric field is decreased in the region where solid dielectric replaces gas dielectric, due to the increase in dielectric constant thus achieved.

The foregoing statements have been confirmed by measuring the corona discharge inception voltage in capacitor rolls wound with polypropylene film, 12.7 micrometers thick, as the dielectric between aluminum foil layers. The capacitor rolls were wound with constant tension on a solid glass arbor to obtain an approximately constant film factor (i.e. fraction of interelectrode space occupied by polypropylene film). Nominal capacitance of the unimpregnated rolls was 20 nanofarads.

The capacitor rolls were mounted in a steel pressure vessel equipped with a suitable high voltage bushing, and the air was evacuated from the vessel. A gas manifold enabled the vessel to be evacuated by a rotary pump and trap, or to be pressurized through regulators from compressed gas bottles.

Figure 2:
FIG. 2 is a micrograph showing deposits of acrylonitrile polymer on the surface and edge of the aluminum foil of a capacitor (at magnification $1000\times$)
Figure 3:
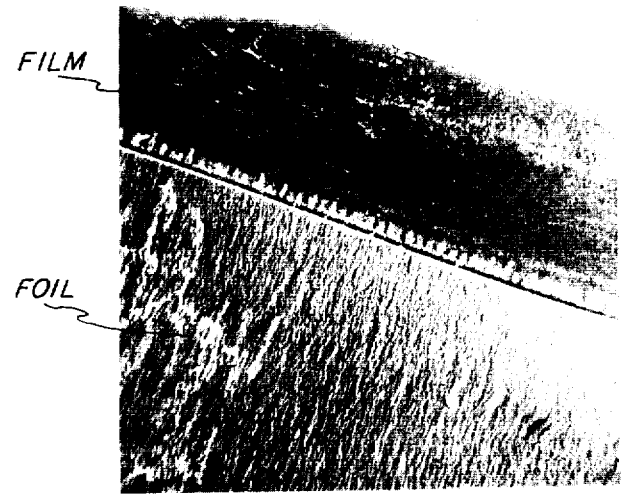
FIG. 3 is a micrograph showing deposits of vinylidene fluoride polymer on the aluminum foil of a capacitor and the edge of the foil (at magnification $50\times$).

Thereafter, various impregnating gases were admitted into the vessel, each to a pressure of 0.165 meganewtons/meter$^2$ (24 p.s.i.a.). In the absence of gas circulation within the vessel, this pressure insured sufficient adsorption of gas molecules onto the capacitor electrodes to maintain an adequate rate of polymerization, although other pressures, above or below atmospheric, may alternatively be used. 60 Hz A.C. voltage was applied across each capacitor and increased until corona discharge pulses on an Electrical Research Association Model 3 discharge detector showed a sustained magnitude of 100 picocoulombs discharge. The inception of discharges in atmospheric air was noted prior to the exposure and again in atmospheric air 40 minutes after the capacitor had been maintained at the 100 picocoulomb level in the presence of the impregnating gas. The percentage increase achieved in discharge inception voltage for various gas impregnants is shown in Table I.

onto the film beyond the foil region. The deposition of polymer is further confirmed by the optical micrograph of FIG. 2 which shows deposits of acrylonitrile polymer generated internally on the foil, and by the optical micrograph of FIG. 3 which shows deposits of vinylidene fluoride polymer generated internally on the foil and at the foil edges.

The foregoing describes a method of fabricating liquid-impregnated or gas-filled capacitors and transformers exhibiting exceptionally high corona-start voltages. These high corona-start voltages are achieved by forming solid polymer in capacitor rolls, transformer cores, and sheetwound transformer coils at the regions of most intense electric field therein. The solid dielectric blocks electron emission into liquid dielectric, decreases local electric fields, and increases breakdown strength near

TABLE I

IMPROVEMENT IN CAPACITOR DISCHARGE INCEPTION VOLTAGE IN ATMOSPHERIC AIR AS THE RESULT OF 100 PICOCOULOMB DISCHARGES MAINTAINED IN A SELECTION OF GASES FOR 40 MINUTES

| | Discharge Inception Voltage | | |
|---|---|---|---|
| Gas Impregnant | Initial | After 40 mins. exposure | % improvement |
| Nitrogen | 300 Volts | 308 Volts | 2.7 |
| Carbon Dioxide | 318 | 320 | 0.6 |
| Vinylidene Fluoride | 297 | 361 | 21.5 |
| Acrylonitrile | 318 | 371 | 16.7 |

It can be seen from Table I that the unsaturated monomeric gases (vinylidene fluoride and acrylonitrile) which would be expected to polymerize readily, yielded a significant increase in discharge inception voltage. The gases which are known not to polymerize (carbon dioxide and nitrogen) yielded negligible change in this parameter. Accordingly, by polymerizing, in situ, monomeric impregnant gases at locations of high stress, an improved capacitor is produced. Other preferred unsaturated monomeric gases useful in the invention include diethylvinylsilane, vinyltrimethylsilane, cyclohexene, heptene-2, valeronitrile, styrene, 2,5 dimethyl-2,4 hexadiene, toluene, xylene and benzene.

Capacitors subjected to plasma polymerization were subsequently unwound and examined by both optical and electron micrography. Presence of the polymer caused the polypropylene film to adhere to the aluminum foil at local sites on the surface. In some instances (especially as to those samples discharges in acrylonitrile vapor) presence of polymer in occasional voids formed by folds or creases in the foil could be clearly seen with the unaided eye. Closer examination revealed that the polymer had been deposited, not as a film, but as a mass of thin adherent particles, each presumably marking the site of an individual discharge. This is visible in the photomicrographs of FIGS. 1 and 3 which show deposits, on polypropylene film and aluminum foil, of acrylonitrile polymer and vinylidene fluoride polymer respectively, FIGS. 1 and 3 being the results of optical micrography.

Fig. 1 shows that a large concentration of polymer has been produced at the edges of the aluminum foil in the vicinity of a corner of the foil, each edge being a highly stressed region. Although most of the discharges at the 100 picocoulomb level have given rise to solid deposits in the bulk of the unit, FIG. 1 provides evidence of some discharges having occurred at the foil edges. These deposits are visible in FIG. 1 as two white, approximately orthogonal lines. Additionally, some polymeric deposits are visible as a white area on the region where the foil had overlaid the film, extending surfaces having high field intensities in gas-filled capacitors and transformers. Because of the desirable results achieved by the invention, it may also be useful in high voltage power cables.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. A process for increasing corona-start voltage and operating voltage of a device to be fluid-impregnated, said device including a layer of insulating material between two layers of conductor, said process comprising:

maintaining said device in an atmosphere of unsaturated monomeric gas; and
  converting said unsaturated monomeric gas to solid polymer at regions of high electric stress in said device when a voltage is applied across said two layers of conductor.

2. The process of claim 1 wherein the step of converting said monomeric gas to solid polymer comprises applying an increasing voltage across said two layers of conductor until discharge pulses across said device show a sustained magnitude at a predetermined level.

3. The process of claim 1 wherein said gas comprises one of the group consisting of vinylidene fluoride and acrylonitrile.

4. The process of claim 2 wherein said gas comprises one of the group consisting of vinylidene fluoride and acrylonitrile.

5. The process of claim 1 including the additional step of impregnating said device with a dielectric fluid.

6. The process of claim 2 including the additional step of impregnating said device with a dielectric fluid.

7. The process of claim 4 including the additional step of impregnating said device with a dielectric fluid.

* * * * *